US011414201B2

(12) United States Patent
Chodavarapu et al.

(10) Patent No.: US 11,414,201 B2
(45) Date of Patent: Aug. 16, 2022

(54) SECURE SMART NODE AND DATA CONCENTRATOR FOR DISTRIBUTED ENGINE CONTROL

(71) Applicants: Vamsy Chodavarapu, Beavercreek, OH (US); Guru Subramanyam, Dayton, OH (US)

(72) Inventors: Vamsy Chodavarapu, Beavercreek, OH (US); Guru Subramanyam, Dayton, OH (US)

(73) Assignee: UNIVERSITY OF DAYTON, Dayton, OH (US)

( * ) Notice: Subject to any disclaimer, the term of this patent is extended or adjusted under 35 U.S.C. 154(b) by 791 days.

(21) Appl. No.: 15/969,992

(22) Filed: May 3, 2018

(65) Prior Publication Data

US 2018/0319508 A1    Nov. 8, 2018

Related U.S. Application Data

(60) Provisional application No. 62/501,324, filed on May 4, 2017.

(51) Int. Cl.
| | |
|---|---|
| *B64D 31/14* | (2006.01) |
| *H01L 23/00* | (2006.01) |
| *B64D 31/06* | (2006.01) |
| *H04L 9/40* | (2022.01) |
| *H03M 1/12* | (2006.01) |
| *B64D 45/00* | (2006.01) |
| *H03M 1/66* | (2006.01) |

(52) U.S. Cl.
CPC .............. *B64D 31/14* (2013.01); *B64D 31/06* (2013.01); *H01L 24/04* (2013.01); *B64D 2045/0085* (2013.01); *H01L 24/48* (2013.01); *H01L 2224/48227* (2013.01); *H01L 2924/09701* (2013.01); *H01L 2924/19101* (2013.01); *H03M 1/12* (2013.01); *H03M 1/66* (2013.01); *H04L 63/0428* (2013.01)

(58) Field of Classification Search
CPC .................. B64D 31/14; B64D 31/06; B64D 2045/0085; B64D 45/00; H01L 24/04; H01L 2224/48227; H01L 2924/19101; H01L 24/48; H01L 2924/09701; H04L 63/0428; H03M 1/12; H03M 1/66
See application file for complete search history.

(56) References Cited

U.S. PATENT DOCUMENTS

| | | | | |
|---|---|---|---|---|
| 6,311,482 | B1 * | 11/2001 | Yamashita | ............ F01N 3/0842 |
| | | | | 60/285 |
| 6,477,054 | B1 * | 11/2002 | Hagerup | ............. H01L 23/3677 |
| | | | | 174/262 |
| 7,861,595 | B2 | 1/2011 | Brown et al. | |

(Continued)

*Primary Examiner* — Tyler J Lee
*Assistant Examiner* — Yufeng Zhang
(74) *Attorney, Agent, or Firm* — Thompson Hine LLP

(57) ABSTRACT

A system is provided for interfacing a Full Authority Digital Engine Control (FADEC) system with engine sensors and actuators using miniaturized Low Temperature Co-fired Ceramic (LTCC) substrates operating as smart notes that communicate digitally over a data bus to a miniaturized LTCC operating as a data concentrator. The use of smart nodes and/or data concentrators assembled on LTCC substrates provides enhanced thermal and vibration performance along with resistance to hydration, improved reliability and reduced overall size of the circuitry unit.

20 Claims, 5 Drawing Sheets

(56) References Cited

U.S. PATENT DOCUMENTS

| | | | |
|---|---|---|---|
| 9,026,273 B2 | 5/2015 | Ziarno | |
| 9,026,279 B2 | 5/2015 | Ziarno | |
| 9,026,336 B2 | 5/2015 | Ziarno | |
| 9,152,146 B2 | 10/2015 | Ziarno | |
| 2005/0132877 A1* | 6/2005 | Hart | F15B 18/00 |
| | | | 91/509 |
| 2012/0024075 A1* | 2/2012 | Peng | G01L 19/04 |
| | | | 73/724 |
| 2015/0363981 A1* | 12/2015 | Ziarno | G07C 5/0841 |
| | | | 701/101 |
| 2017/0050677 A1* | 2/2017 | Czinger | B62D 29/046 |

* cited by examiner

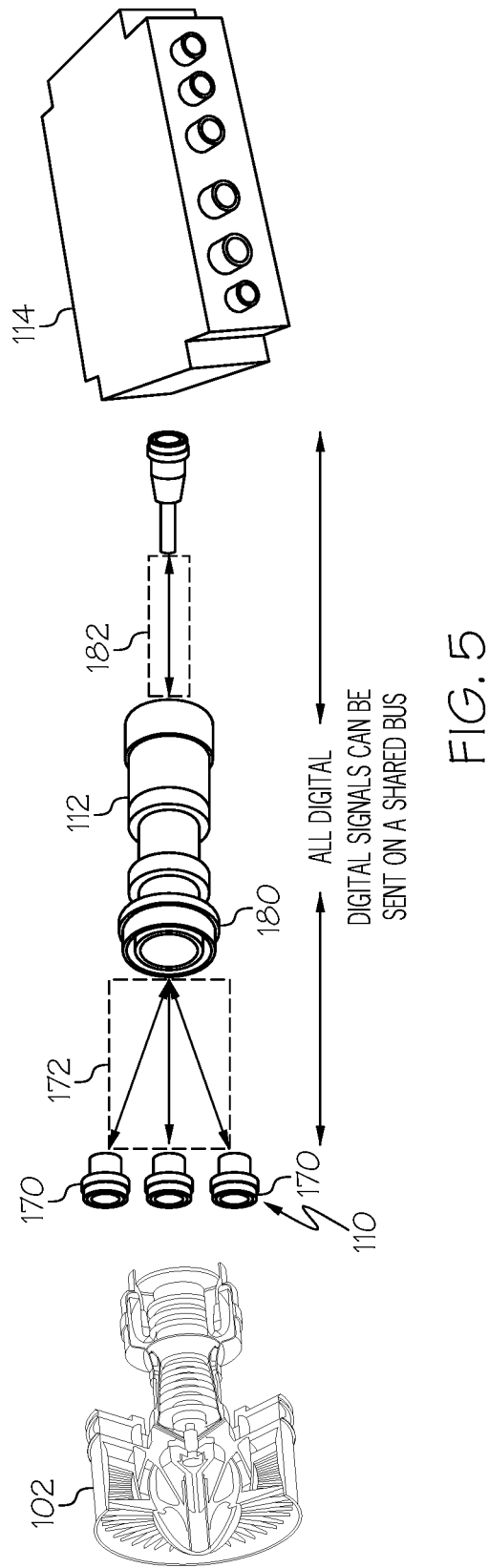

SECURE SMART NODE AND DATA CONCENTRATOR FOR DISTRIBUTED ENGINE CONTROL

CROSS REFERENCE TO RELATED APPLICATIONS

This application claims the benefit of the filing date of U.S. Provisional Application No. 62/501,324, which was filed on May 4, 2017, and the contents of which are incorporated by reference in its entirety as part of this application.

STATEMENT REGARDING FEDERALLY SPONSORED RESEARCH OR DEVELOPMENT

This invention was made with U.S. Government support under U.S. Air Force/Spectral Energies, Grant No. FA8650-16-M-2687 and SB-1605-001-1. The U.S. Government may have certain rights in the invention.

TECHNICAL FIELD

The present application relates to Full Authority Digital Engine Control (FADEC), more particularly to interfacing the FADEC with aircraft engine sensors and actuators using a miniaturized Low Temperature Co-fired Ceramic (LTCC) substrate or other composite ceramic substrate having a Smart Node (SN) and a miniaturized LTCC or other composite ceramic substrate having a Data Concentrator (DC) that communicate with one another digitally over a data bus.

BACKGROUND

A FADEC is an essential part of an aircraft's gas turbine engine control that consists of a computer, interface sensors and actuators, and Input/Output (I/O) ports that control all aspects of the engine. The FADEC uses speed, temperature, and pressure sensors, among others, to monitor and control the status of the aircraft engine and adjust parameters to achieve optimal engine performance. Today's advanced fighter jets are designed to undertake fast maneuvers with rapid altitude changes, along with rapid changes in flight speeds from takeoff to supersonic velocities. These rapid and large variations in engine operational conditions cause enormous changes in inlet temperature, inlet pressure, and exhaust pressure in the engine and pose a significant challenge in the design of the engine control systems.

There are many sensors and actuators that are placed in close proximity to the hot engine, most of which are currently hard-wired to the FADEC. In addition, the FADEC systems are often bundled with other engine-related systems such as Prognostics Health Monitoring (PHM) and their associated sensors. The government and industry are diligently working towards a better alternative to implement a distributed control scheme by placing the engine controls closer to the engine as a smart node. This strategy reduces the burden of needing heavy wires and wire harnesses and multiple connector interfaces, thereby reducing system complexity, lowering aircraft weight and simplifying maintenance.

Distributed engine control, via smart node, has been identified as a valuable upgrade to the conventional FADEC in aircraft engines to make the entire system more flexible, upgradable, lightweight, and lower cost. The smart node would include sensors and actuators and sensor signal conditioning and processing components, and would transmit digital data on a shared I/O bus to a distantly placed simplified FADEC system. Thus, the smart node, placed close to the aircraft engine, could be subjected to high temperatures.

Moreover, attempts at placing smart nodes in engine systems to date have actually added weight to the engine versus a single unit FADEC.

High temperature capable silicon and silicon carbide based electronic devices are being developed which could be used for these smart nodes, with temperature capability on the order of 250° C. for Silicon-On-Insulator (SOI) type components, and 500° C. for Silicon Carbide (SiC) type components. Some of these components are in production today by a select few manufacturers, especially for high end applications such as for space and satellites, where the premium cost is justifiable as the required volumes are low. However, such is not the case for aircraft engines and commercial aerospace, where product cost is a significant factor in the overall business case, volumes are higher, and supply chain flexibility and redundancy are critical.

Alternatively, Complementary Metal-Oxide Semiconductor (CMOS) based electronics on silicon substrate currently dominate modern semiconductor industry. It has numerous advantages including low power consumption, low cost, mass-production and large scale integration. However, at high temperatures exceeding 125° C., conventional electronics made in bulk CMOS technology suffer from many drawbacks including degradations in electron/holes mobility, reduction in MOS transistors threshold voltage, an increase of bulk junction leakage currents, and an increase in silicon intrinsic carrier density, thus necessitating special design considerations. At temperatures above 300° C., the silicon intrinsic carrier density is comparable to the doping level, which imposes the theoretical temperature upper limit for CMOS technology. Colder temperatures up to −55° C. do not have detrimental effects on CMOS electronics and can further help to improve the signal to noise ratio due to improved carrier mobility and reduced noise effects.

Most high temperature electronic circuits for commercial applications are built on polyamide-based Printed Wire Boards (PWBs) that are typically unreliable with sub-par performance for aerospace applications. Significant challenges exist for circuit board materials for implementation of high temperature aerospace electronics that do not result in high cost, low reliability, and poor durability of the electronics system. In addition, packaging and integration of passive devices also pose significant challenges for aerospace electronic systems. Continuous operation of electronic systems at temperatures exceeding 150° C. built on polyimide PWBs is not reliable due to high moisture absorption by the polyimide. Under these conditions, the polyimide and other types of polymers stretch and bulge, which distorts and damages the circuit assembly and passive components limiting the lifetime of operation in aerospace applications.

A smart node placed close to the aircraft engine could be subjected to a wide operational temperature range from −55° C. to 225° C. and beyond. The lower end of the temperature range is not problematic to the proper functioning of electronics. However, the higher end of the temperature causes significant leakage current, breakdown of interconnections, and even complete system failure. Thus, the development of a smart node needs innovation in both high temperature microelectronics, advanced electronics packaging, and strategic system integration.

BRIEF DESCRIPTION OF THE DRAWINGS

The claimed subject matter is described with reference to the accompanying drawings. A brief description of each

FIG. 5 is a schematic representation of system integration of smart node and data concentrator.

SUMMARY

Figure 1:
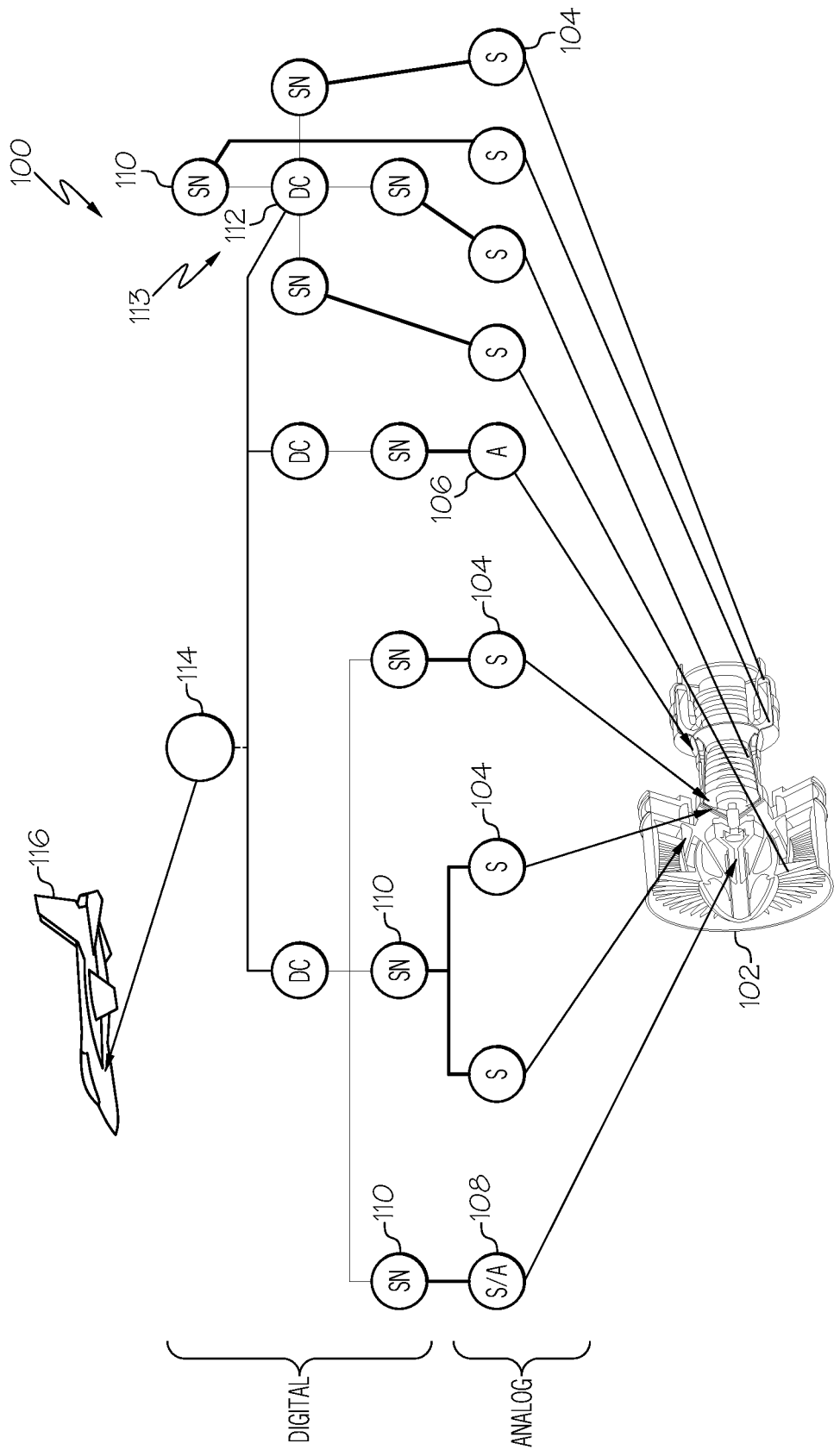
FIG. 1 is a schematic illustration of a smart node and data concentrator architecture for an engine system.

Distributed engine control architecture makes use of Smart Nodes (SN) to receive data from sensors or control actuators that are directly interfaced to the jet engine. The data from the various smart nodes is communicated over data buses to Data Concentrators (DC) that include higher signal processing capabilities than smart nodes. The Data Concentrator will help to filter, identify, prioritize, evaluate and synchronize smart node information along with the prognostics health before transferring the information to a simplified FADEC. Finally, the FADEC interfaces with the flight avionics.

The goal of the distributed engine control is to enable a highly integrated system that is agile and that can make real-time intelligent decisions related to jet engine performance and health.

In one aspect, smart nodes and data concentrators have been developed that are assembled on an LTCC or other composite ceramic substrate that offer significantly enhanced thermal and vibration performance along with resistance to hydration, improved reliability, and reducing the overall size of the systems. Comparing to previous generations, our smart node and data concentrator provide integrated encryption of the data and memory, improving the security of the system. The result is a long-lasting, reliable, versatile, and low-cost electronic substrate platform for the smart node and data concentrator that enables placement of these components in the high temperature zone enabling faster evaluation of data and decision making for adjustment of sensors and actuators of the engine.

DETAILED DESCRIPTION

The following detailed description will illustrate the general principles of the invention, examples of which are additionally illustrated in the accompanying drawings. In the drawings, like reference numbers indicate identical or functionally similar elements.

Figure 2:
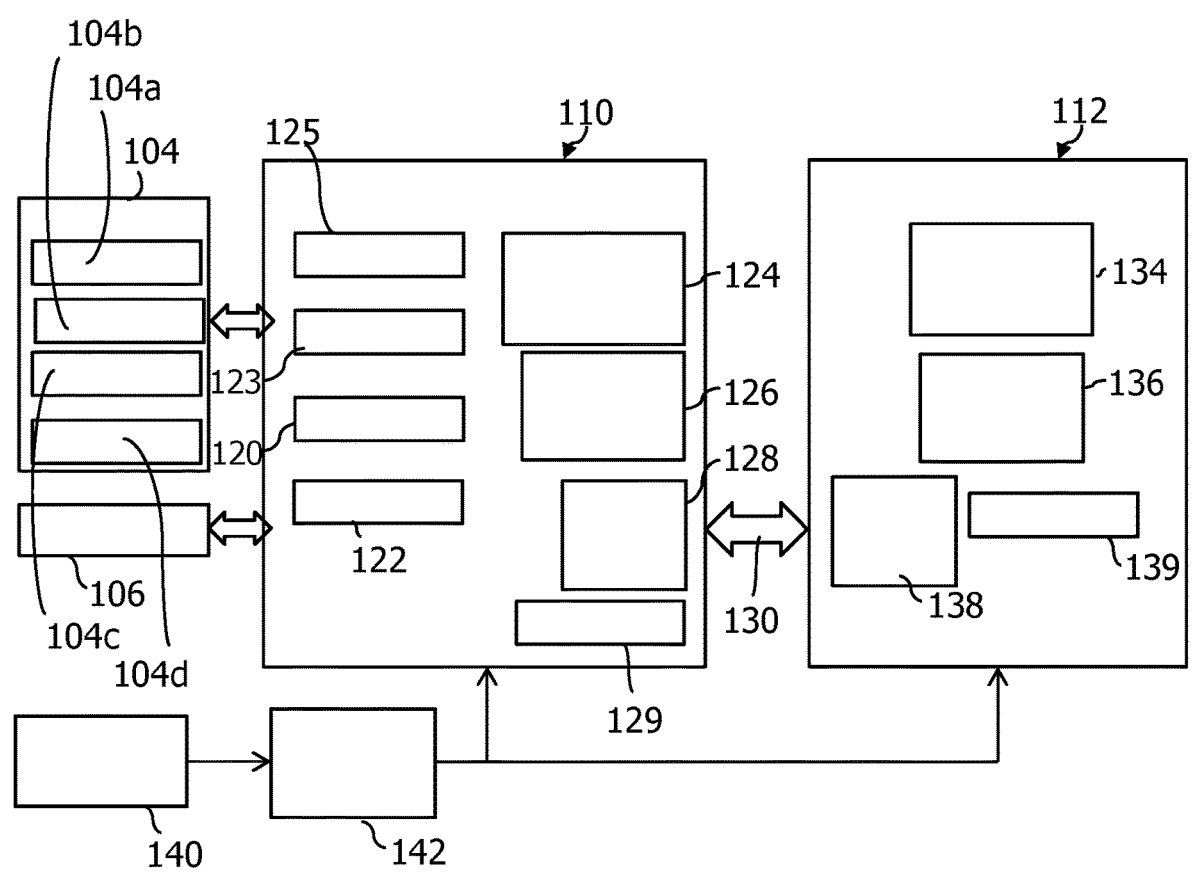
FIG. 2 is a schematic diagram of system architecture for a smart node and data concentrator.

Referring to FIG. 1, the disclosed system 100 focuses on advanced electronics packaging and strategic system integration aspects, the growing importance of cybersecurity, the speed of digital communication, reducing wiring in an engine system, and making components for positioning closer to the engine. An engine 102 has a plurality of sensors 104, actuators 106, and sensor-actuator combinations 108, which are electronically operatively coupled individually and/or in combination to smart nodes 110, which are electronically operatively coupled individually and/or in combination to one or more data concentrators 112 that are electronically operatively coupled individually and/or in combination to a FADEC or simplified FADEC 114, here in an aircraft 116. As shown in FIG. 2, the sensors 104 may include, but are not limited to strain gauges, thermocouples, solenoids, and resistance temperature detectors (RTD).

Still referring to FIG. 1, the electrical connection between the smart node(s) 110 and the data concentrator(s) 112 is a digital network, and a plurality of smart nodes 110 may communicate with a single data concentrator 112 over a single shared I/O bus. The smart node 110 processes the analog signals from the sensors and actuators or combinations thereof 104, 106, 108 and sends analog signals to the actuators 106 when adjustments thereto are needed to control the engine 102. The smart node 110 converts the analog signals to digital signals and sends the same to a data concentrator 112. The data concentrator 112 processes the digital signals from the smart node 110 and also makes decisions in response thereto. Having one data concentrator 112 receiving digital signals from multiple smart nodes 110 enables the processing and decision making of the data concentrator 112 to consider the multiplicity of information from the sensors and actuators to enhance the decision making.

In one embodiment, as shown to the right in FIG. 1, a data concentrator 112 is positioned as a central hub 113, as it is at a higher architectural level than the smart node 110, and it is in a better situation to make intelligent decisions based on information from different regions of the jet engine and including appropriate engine prognostic health information, if needed. As shown in FIG. 1, there is no direct smart node 110 to smart node 110 communication, which reduces the amount of wiring required.

Referring to FIG. 2, the system architecture for a smart node 110 and a data concentrator 112 is shown. The smart node 110 is electrically operatively coupled to the sensors 104 and actuators 106, which are analog devices. The smart node 110 includes an analog to digital converter 120 for converting the analog signals from the sensor 104 and actuators 106 to digital signals. The smart node 110 also includes a digital to analog converter 122 for sending analog signals back to the sensors 104 and actuators 106. The smart node 110 includes a microcontroller 124, memory/registers 126, and a port 128, such as an Ethernet port, for connection to the data concentrator 112 via a bus 130 for transmission of digital signals. The microcontroller 124 may be an 8 bit, 16 bit, 32 bit, or 64 bit microcontroller. Further, the smart node may include on-board encryption software 129 to encrypt the data being transmitted therefrom and/or stored thereon for an added level of protection for the engine. The smart node 110 may include an amplifier 123 to boost signals received therein or transmitted therefrom and a pulse width modulator 125.

The data concentrator 112 includes a microcontroller 134, memory/registers 136, and a port 138, such as an Ethernet port, for connection to the smart node 110 via bus 130 for transmission of digital signals. The microcontroller 134 may be an 8 bit, 16 bit, 32 bit, or 64 bit microcontroller. Further, the data concentrator 112 may include on board encryption software 139 to encrypt the data being transmitted thereto, therefrom and/or stored thereon for an added level of protection for the engine. The data concentrator 112 includes a second port (not shown) for connection or wiring for a direct connection to the FADEC.

The smart node 110 and data concentrator 112 are electrically connected to a power source 140. The power source 140 may be connected to a direct current converter 142 to supply the smart node 110 and the data concentrator 112 with the appropriate power level.

Figure 3:
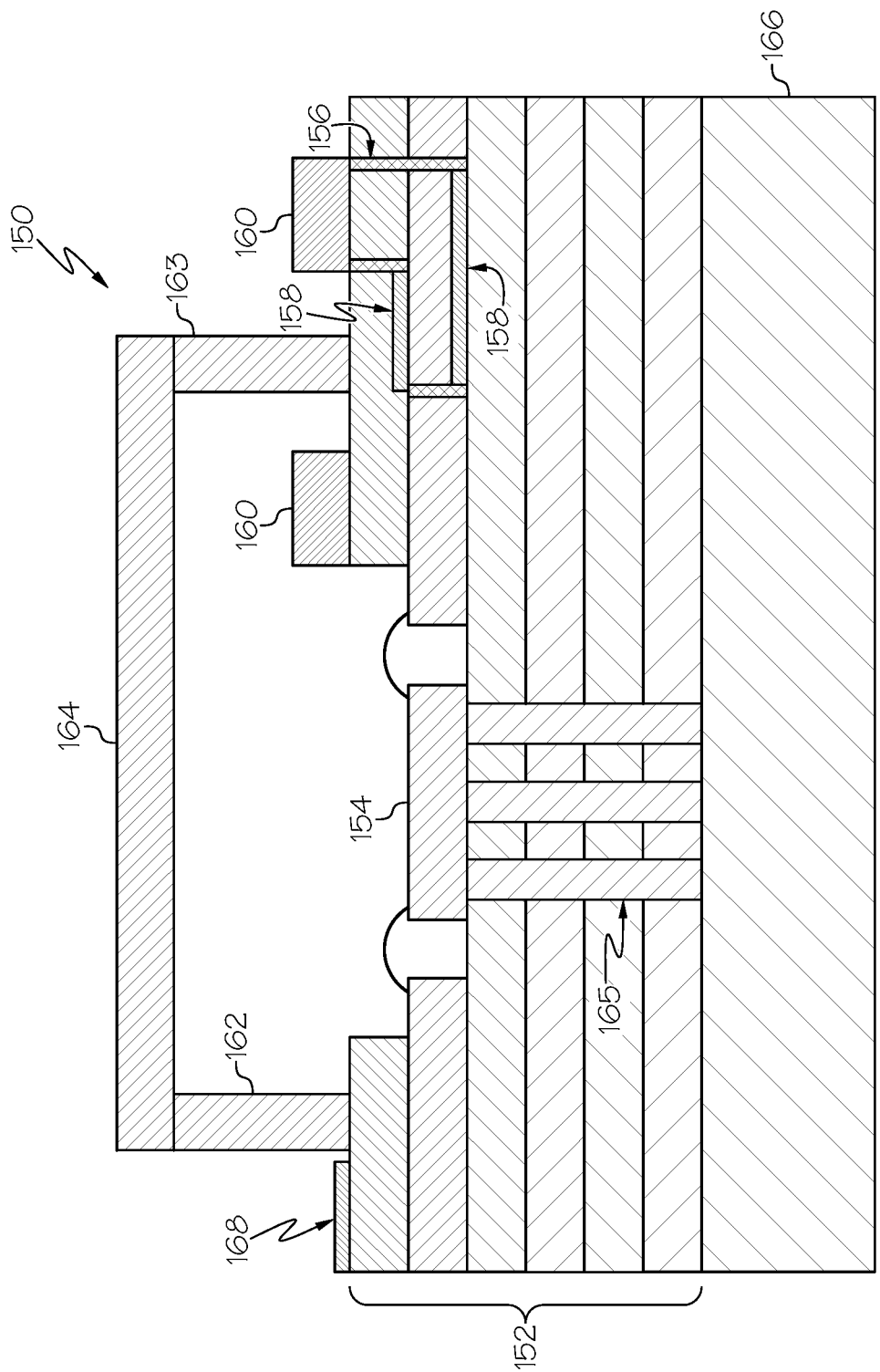
FIG. 3 is a longitudinal cross-sectional view of an LTCC substrate comprising a smart node.
Figure 4:
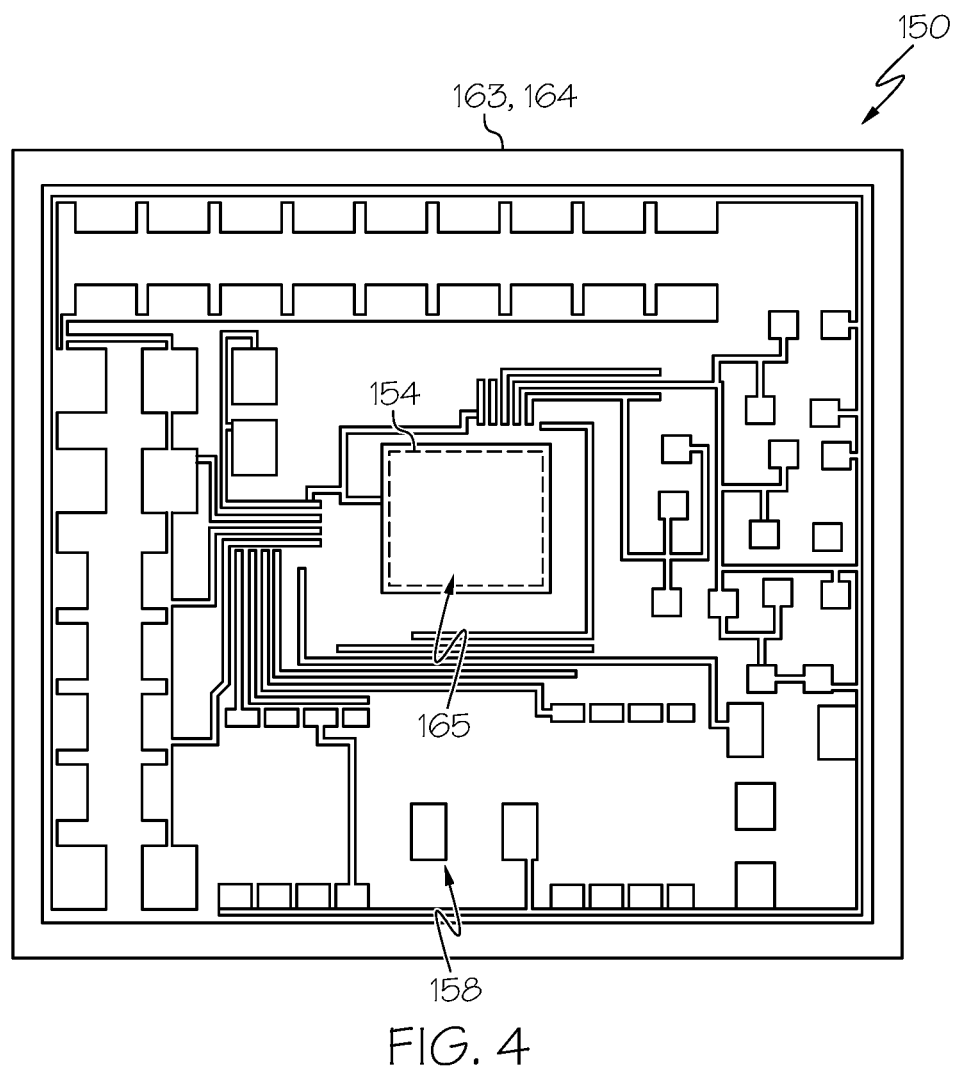
FIG. 4 is a photograph of an LTCC System in Package (SiP) design for smart note and data concentrator.

Referring now to FIGS. 3 and 4, a circuitry unit 150 is shown that comprises a Low Temperature Co-fired Ceramic (LTCC) or any other composite ceramic substrate 152. Depending upon what chip 154 is placed in the circuitry unit 150, the circuitry unit 150 may be a smart node 110 or it may be a data concentrator 112. The LTCC substrate 152 is a multilayer ceramic technology that provides the circuitry unit 150 with buried interconnects 156 between the components and buried passive components 158, such as capacitors, diodes, and/or resistors, and provides for fine line patterning, which both contribute to the miniaturization thereof. LTCC has excellent mechanical and electrical properties, especially high-frequency and high-temperature performance. As such, the smart node 110 and data concentrator 112, with on board encryption, are rated for operating temperatures from −55° C. to 225° C. The LTCC circuitry unit 150 has screen printed gold and/or silver conductors, a directly wire bonded microcontroller (or integrated circuit) (see chip 154 in FIG. 3), solder Surface-Mount Devices (SMDs) 160, a hermetic sealed (vacuum) chamber 162, embedded passive components 158 using screen-printed thin-film structures, thermal management structures (thermal vias 165 and/or a heat sink 166) to provide cooling to the chip 154, and may include thin film devices 168. In one embodiment, a thin film device is a resistor.

The LTCC circuitry unit 150 shown in the photograph of FIG. 4 is about the size of a U.S. quarter. The circuitry unit 150 may be larger or smaller than a U.S. quarter, and it may be square as shown, round, hexagonal, or any other polygonal shape desired for the circuitry unit's position within the system architecture. The extremely small size, weight and lower power requirements of the LTCC circuitry unit 150 allow the smart node 110 and data concentrator 112 to be positioned conveniently where additional housing wires or power supply routing can be minimized, such as within standard connectors already being used in the engine system in which the disclosed system architecture is incorporated. In one embodiment, the standard connector is a military connector—83723 connector plugs. In another embodiment, the circuitry unit 150 may be placed in a connector joint within the wiring itself. All of these approaches allow engine manufacturers to connect the circuitry unit 150 to the power feed already present in the cable connected to the connector or connector joint and to a bus or other digital communication/signal feed already present in the connector or connector joint. This reduces the weight and the cost of heavy analog wiring harnesses, in favor of smaller ones using only digital communication, as multiple digital signals can be sent on a single shared bus.

It is advantageous to have the smart node and/or the data concentrator assembled on an LTCC substrate because it provides enhanced thermal and vibration performance along with resistance to hydration, improved reliability and reduced overall size of the circuitry unit. These circuitry units satisfy all constraints on size, weight, power and cost, while providing high performance as part of next generation FADECs. Furthermore, the smart node and data concentrators allow autonomous decision making in a local closed loop system that is close to the engine, such as a jet engine, which provides the ability to make a faster decision related to the engine condition and reduces the response time for the overall system.

The circuitry unit 150 of FIG. 3 may be made by layering sheets of the LTCC, which for a ceramic substrate are sometimes referred to as "green tape," making a pattern for interconnects within any one or more layers, for example by laser punching, screen printing on interconnects or other features. The brazed heat sink 166 may be added by screen printing the material for the layer on the outermost layer of the LTCC. The thermal vias 165 may be silver and/or gold interconnects. The thermal vias vent heat away from the chip 154. After the desired electronic structures and interconnects are in place in, on (buried), and/or through the LTCC, the stack is sintered, for example at a temperature of about 900° C. Subsequently, to further protect the chip 154 from environmental heat, such as high temperatures experienced in close proximity to an engine, for example a jet engine, a frame 163 and a lid 164 are connected to the circuitry unit 150 at a position to define a chamber 162 above and surrounding the chip 154, which is hermetically sealed. Prior to formation of the hermetic seal, the atmosphere within the chamber 162 is removed to create a vacuum environment.

Referring now to FIG. 5, a smart node 110 is inside the head end 170 of each of the connectors 172 mated to the sensors 104, actuators 106, and/or sensor-actuator combinations 108, and the opposing end (not shown) of the connector 172 is connected to a head end 180 of another connector 182 housing the data concentrator 112 and connected to the FADEC 114. Here, wires or power supply routing can be minimized, such as within standard military connectors (e.g., 83723 connector plugs) or as a connector joint within the wiring itself.

The embodiments of this invention shown in the drawings and described above are exemplary of numerous embodiments that may be made within the scope of the appended claims. It is contemplated that numerous other configurations of the engine system may be created taking advantage of the disclosed approach.

What is claimed is:

1. A distributed engine control system comprising:
a plurality of smart nodes each assembled on a low temperature co-fired ceramic smart node substrate and comprising an analog to digital converter, a digital to analog converter, a microcontroller, a memory, and a data port, wherein each smart node is operatively coupled to at least one sensor or actuator to receive signals therefrom;
a data concentrator assembled on a low temperature co-fired ceramic data concentrator substrate and comprising a microcontroller, a memory, a first data port, and a second data port; and
an I/O bus operatively connected to the data ports of the plurality of smart nodes and the first data port of the data concentrator to transmit digital signals relating to the signal of the sensor or actuator from each smart node to the data concentrator, wherein the data concentrator is configured to receive an output from each of the plurality of smart nodes and provide an aggregated output to the I/O bus, and wherein each smart node and data concentrator is positioned within a close proximity to an engine, with each smart node being positioned closer to the engine than the data concentrator, and at least one of: a) the plurality of smart nodes or b) the data concentrator are configured to operate at a temperature up to 225 degrees Celsius.

2. The distributed engine control system of claim 1, wherein at least one of the plurality of smart nodes includes encryption software operable to encrypt data being transmitted by said smart node.

3. The distributed engine control system of claim 1, wherein the data concentrator includes encryption software operable to encrypt data being transmitted by the data concentrator.

4. The distributed engine control system of claim 1, wherein the second data port of said data concentrator is operatively connected via the I/O bus to a full authority digital engine control (FADEC) system.

5. The distributed engine control system of claim 1, wherein at least one of said plurality of smart nodes is positioned within a standard 83723 connector plug.

6. The distributed engine control system of claim 1 further comprising:
a first sensor operatively coupled to a first smart node of the plurality of smart nodes, wherein the first smart node is configured to receive an analog signal from the first sensor indicative of a first engine parameter;
a second sensor operatively coupled to a second smart node of the plurality of smart nodes, wherein the second smart node is configured to receive an analog signal from the second sensor indicative of a second engine parameter;
wherein the first data port of the data concentrator is operatively connected to the data port of the first and second smart nodes to receive digital signals indicative of the first and second engine parameters;
a full authority digital engine control system operatively connected to the second data port of the data concentrator to receive digital signals indicative of the first and second engine parameters and to send digital signals indicative of engine operation conditions;
an actuator; and
a third smart node comprising a digital to analog converter, a microcontroller, and a data port assembled on a low temperature co-fired third smart node ceramic substrate, wherein the third smart node is operatively connected to the data concentrator to receive digital signals, and wherein the third smart node is operatively coupled to the actuator to send a control signal that activates the actuator.

7. The distributed engine control system of claim 1, wherein the first data port of the data concentrator is an Ethernet port.

8. The distributed engine control system of claim 1 wherein each of the plurality of smart nodes comprises:
a heat sink located on a first outer surface of the low temperature co-fired ceramic smart node substrate;
a hermetically sealed chamber located on a second outer surface of the low temperature co-fired ceramic smart node substrate;
wherein the microcontroller is located inside the hermetically sealed chamber;
a thermal conductor connected to the microcontroller and the heat sink through the low temperature co-fired ceramic smart node substrate to vent heat; and
an electrical conductor embedded within the low temperature co-fired ceramic smart node substrate and electrically connected to the microcontroller to form an electrical path to the microcontroller.

9. The distributed engine control system of claim 8, wherein the atmosphere within the hermetically sealed chamber has been removed to create a vacuum.

10. The distributed engine control system of claim 8, wherein at least one smart node is positioned inside a head of a connector plug connected to a sensor.

11. The distributed engine control system of claim 1 wherein both the plurality of smart nodes and the data concentrator are configured to operate at a temperature of up to 225 degrees Celsius.

12. The distributed engine control system of claim 1 wherein each of the plurality of smart nodes have a surface area of less than about 0.72 square inches.

13. The distributed engine control system of claim 1 wherein the data concentrator has a surface area of less than about 0.72 square inches.

14. A distributed engine control system comprising:
a plurality of nodes, each node being operatively coupled to a sensor or actuator to receive an output signal of the sensor or actuator and being positioned on a low temperature co-fired ceramic node substrate, wherein each node includes a controller and is positioned proximate to an engine and configured to operate at a temperature up to 225 degrees Celsius;
a data concentrator positioned on a low temperature co-fired ceramic data concentrator substrate, wherein the data concentrator is operatively coupled to each of the plurality of nodes to receive an output from each of the plurality of nodes relating to the output signal of the associated sensor or actuator and provide an aggregated output, wherein the data concentrator includes a controller and is positioned proximate to the engine, with each smart node being positioned closer to the engine than the data concentrator and wherein the data concentrator is configured to operate at a temperature up to 225 degrees Celsius; and
an I/O bus operatively connected to the data concentrator and configured to receive the aggregated output.

15. The distributed engine control system of claim 14 wherein at least one of the data concentrator, or each of the plurality of nodes, has a surface area of less than about 0.72 square inches.

16. The distributed engine control system of claim 14 wherein the I/O bus is operatively coupled to a full authority digital engine control system to thereby communicate data between the data concentrator and the full authority digital engine control system.

17. The distributed engine control system of claim 14 further comprising at least one of a sensor or actuator associated with an aircraft engine, wherein the at least one of the sensor or actuator is operatively coupled to one of the nodes.

18. The distributed engine control system of claim 17 wherein the at least one of the sensor or actuator is configured to provide an analog output, and wherein the at least one of the nodes includes an analog to digital converter configured to convert the analog output of the at least one of the sensor or actuator to a digital output, and wherein the at least one of the nodes is configured to provide the digital output to the data concentrator.

19. A distributed engine control system comprising:
a plurality of nodes, each node being positioned on a low temperature co-fired ceramic node substrate and being operatively coupled to a sensor or actuator to receive an output signal of the sensor or actuator, wherein each node includes a controller, is positioned proximate to an engine, with each smart node being positioned closer to the engine than the data concentrator, and wherein each data concentrator is configured to operate at a temperature up to 225 degrees Celsius, and wherein each node has a surface area of less than about 0.72 square inches;
a data concentrator positioned on a low temperature co-fired ceramic data concentrator substrate, wherein the data concentrator includes a controller, is positioned in proximate to the engine and is configured to operate at a temperature up to 225 degrees Celsius, wherein the data concentrator has a surface area of less than about 0.72 square inches, and wherein the data concentrator is operatively coupled to each of the plurality of nodes to receive an output from each of the plurality of nodes relating to the output signals of the associated sensors or actuators and provide an aggregated output; and an I/O bus operatively connected to the data concentrator and configured to receive the aggregated output.

20. The distributed engine control system of claim 19 further comprising at least one of a sensor or actuator associated with an aircraft engine, wherein the at least one of the sensor or actuator is operatively coupled to one of the nodes, and wherein the I/O bus is operatively coupled to a full authority digital engine control system to thereby communicate data to and from the data concentrator.

* * * * *